July 6, 1948.  T. M. EDISON  2,444,815
STEREOSCOPIC MAPPING INSTRUMENT
Filed July 29, 1943  9 Sheets-Sheet 5
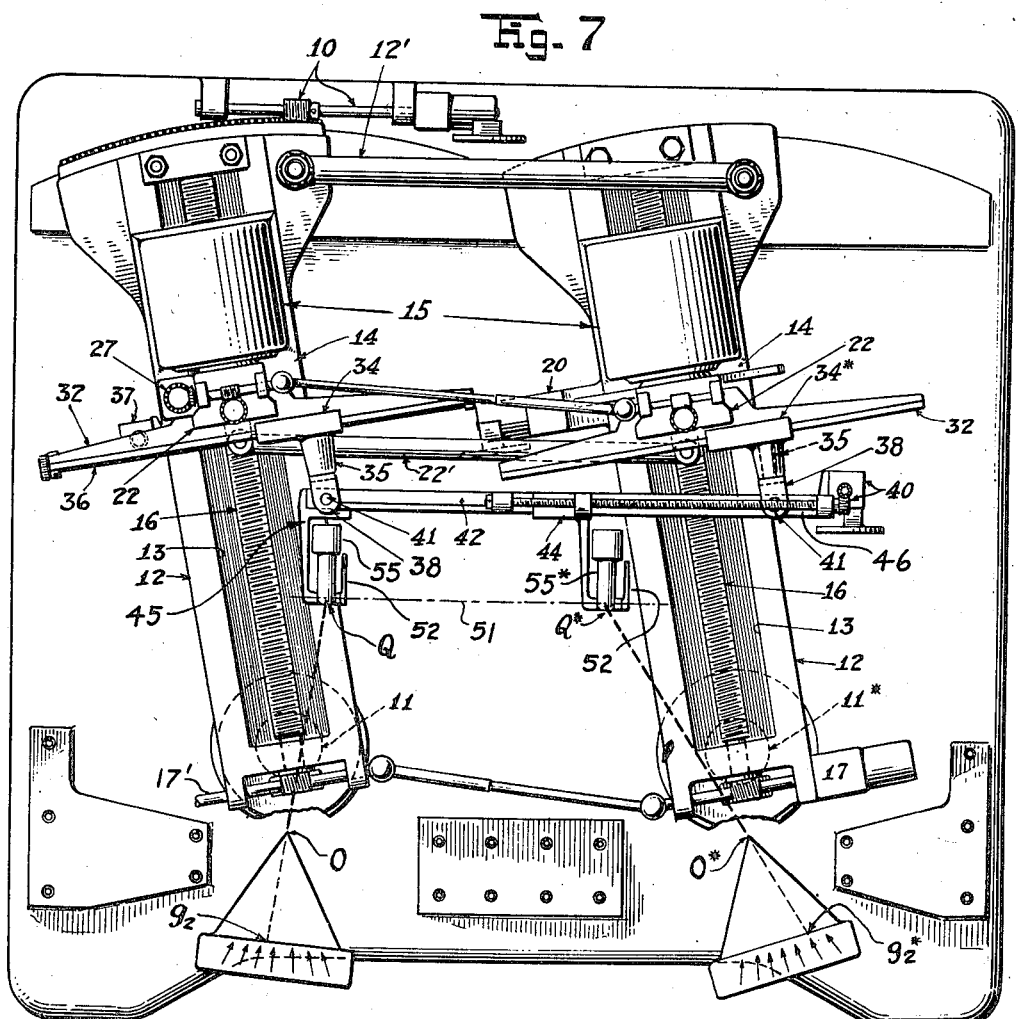
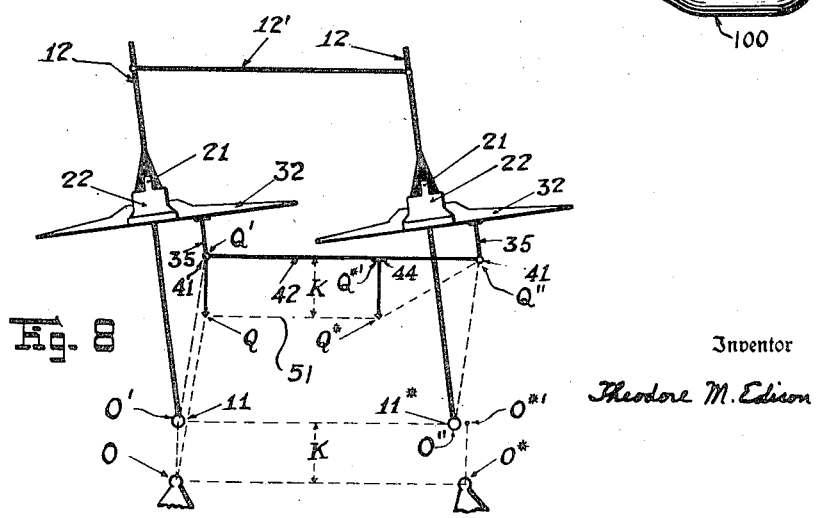
Inventor
Theodore M. Edison Inventor Theodore M. Edison

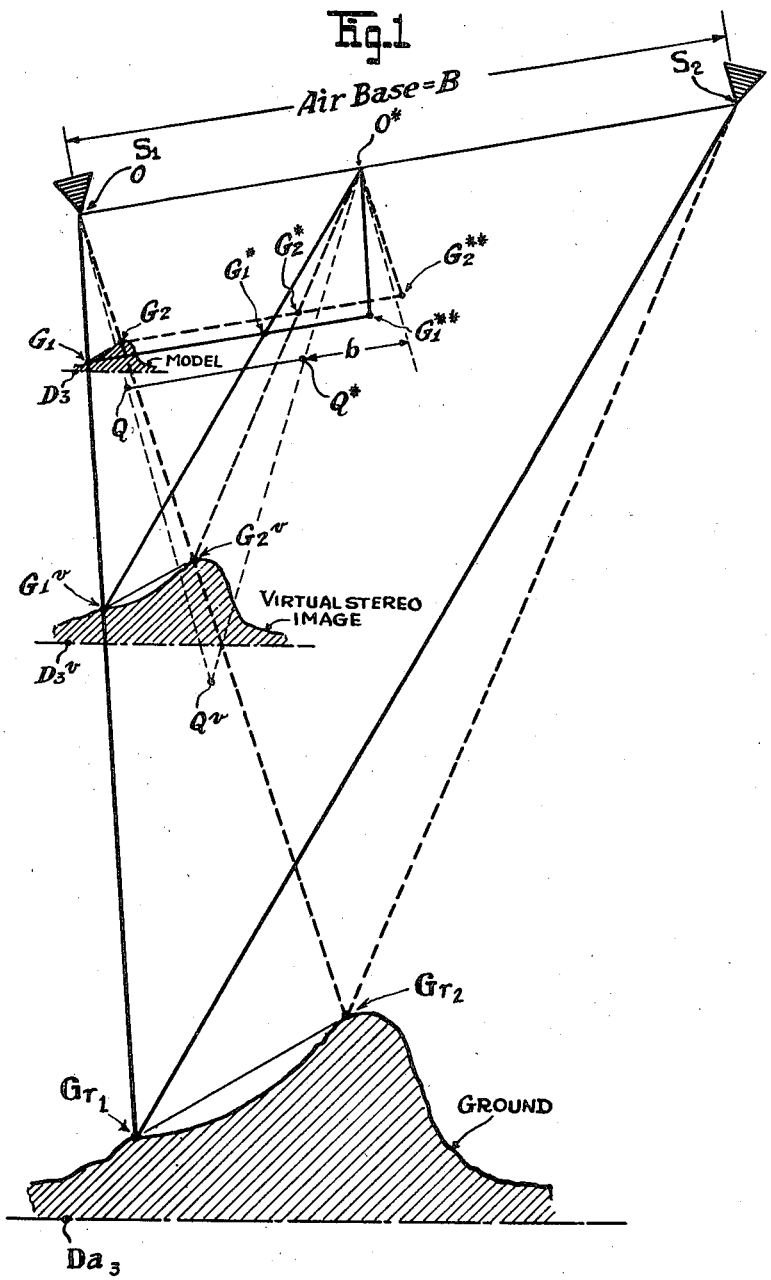

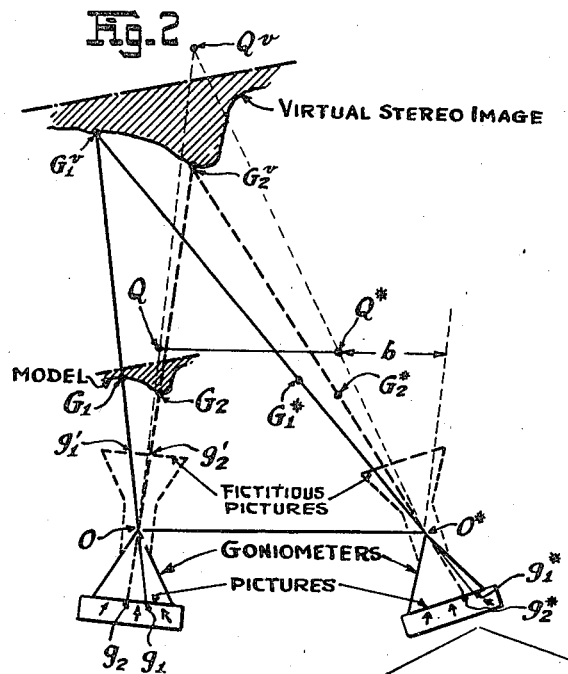
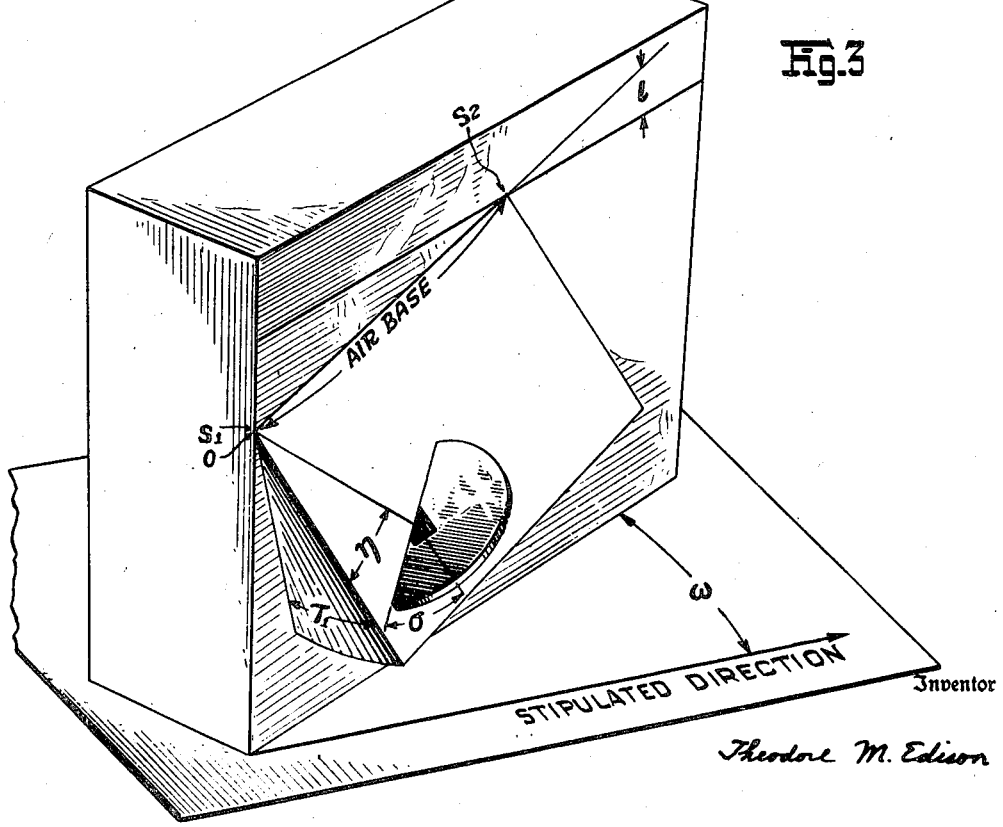

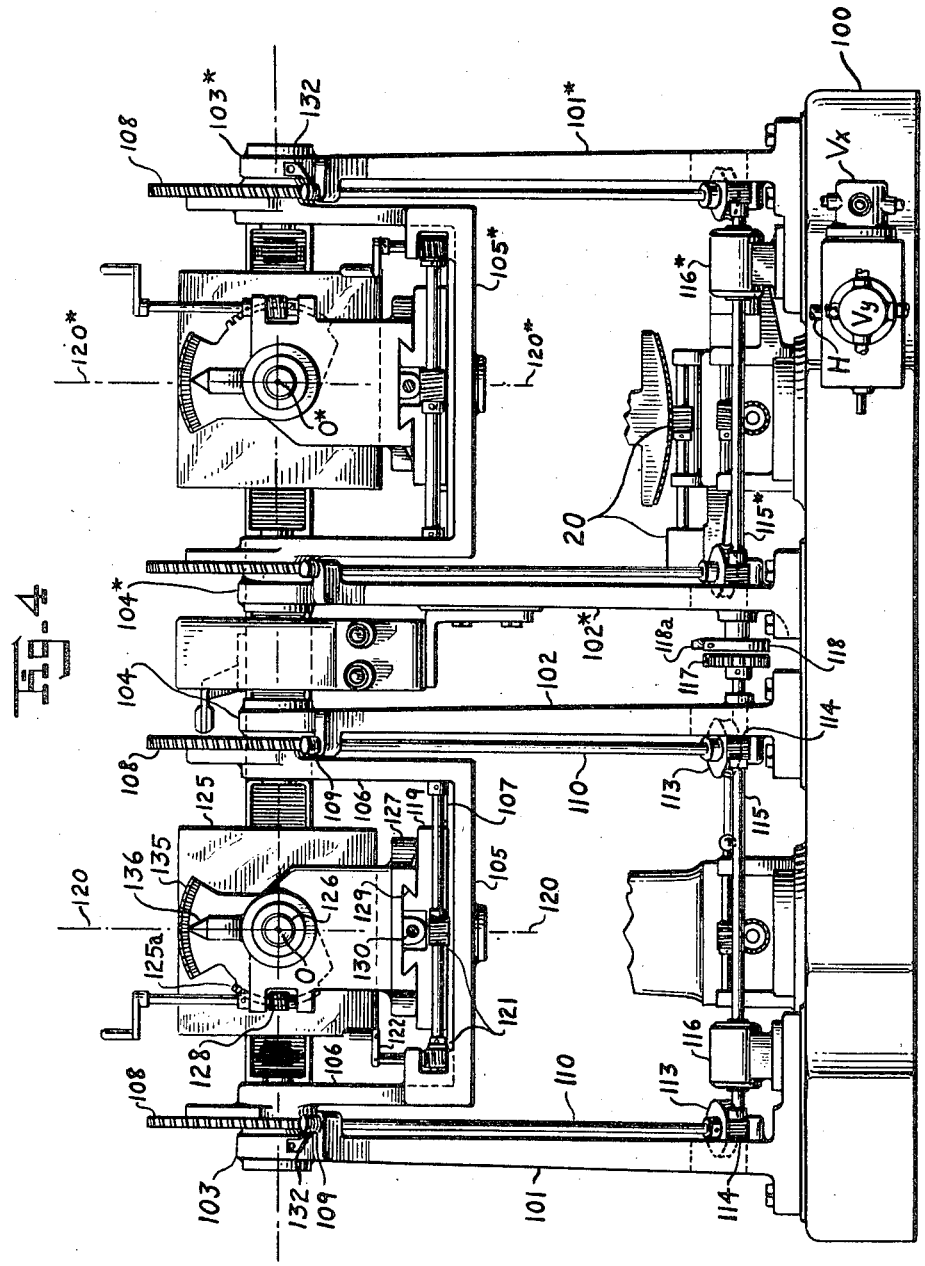

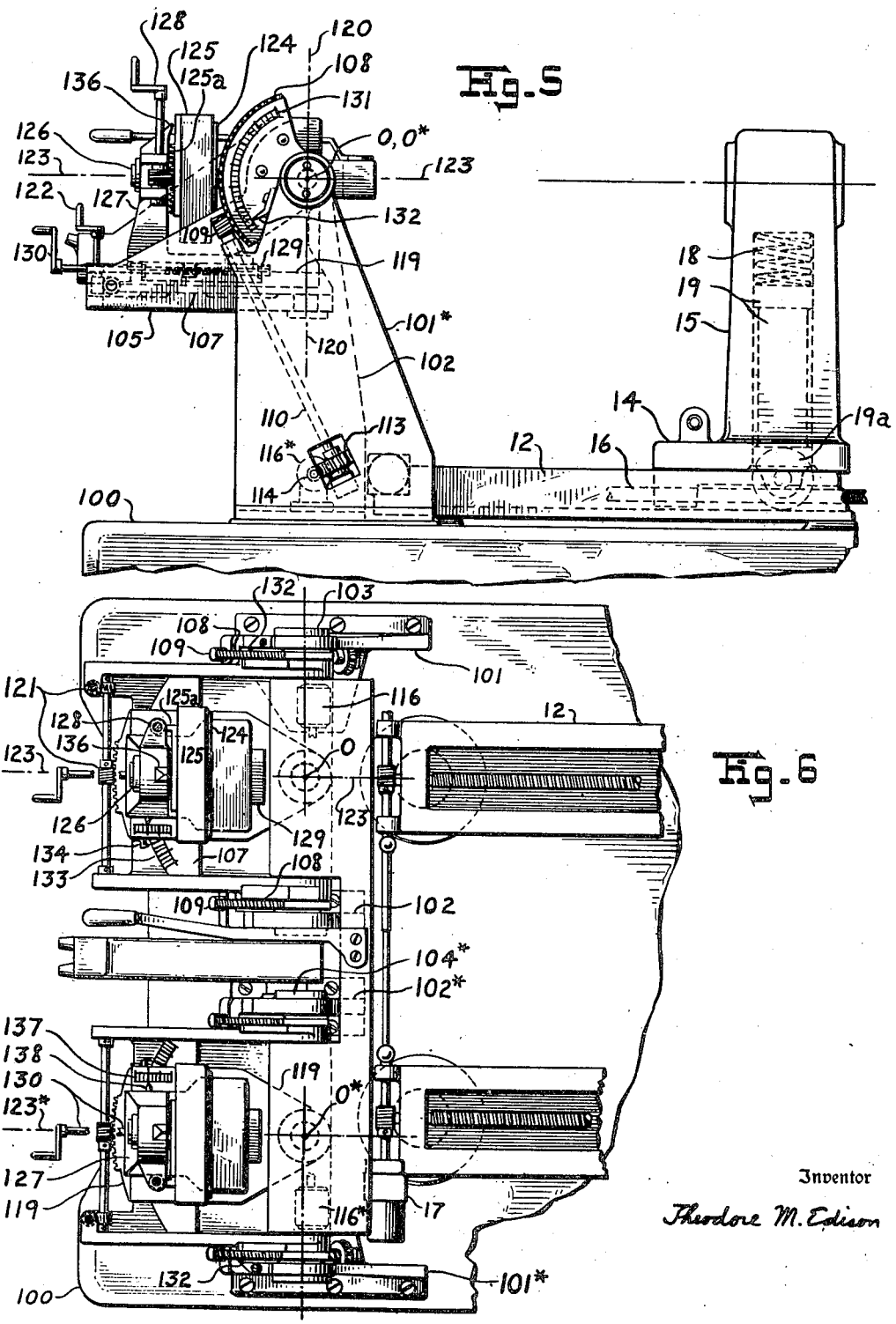

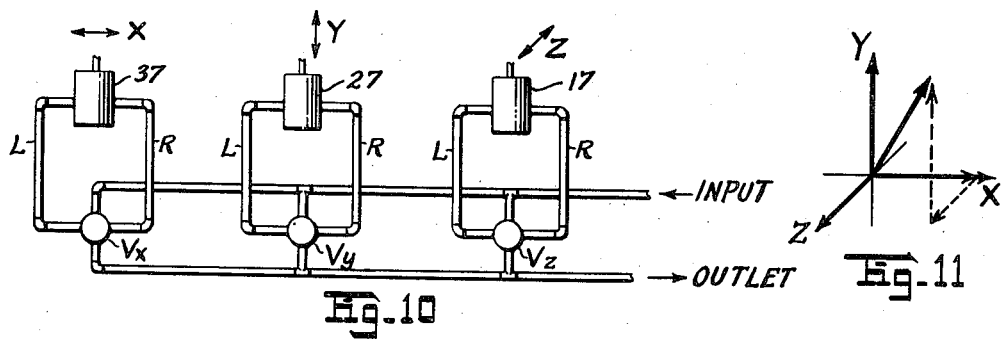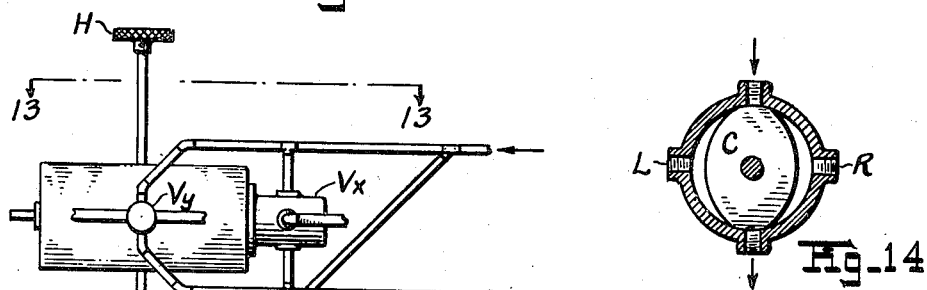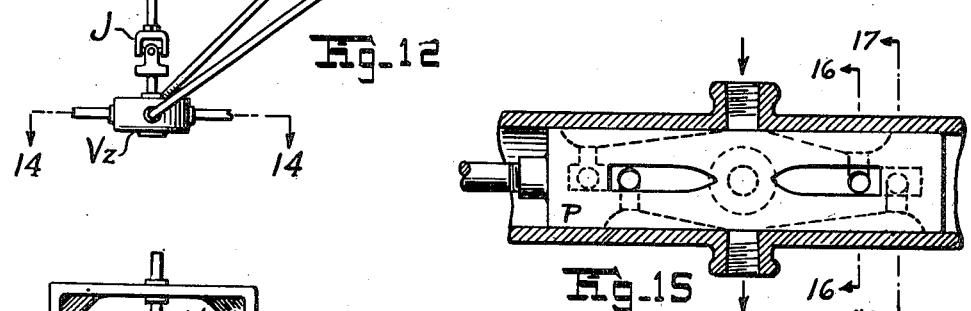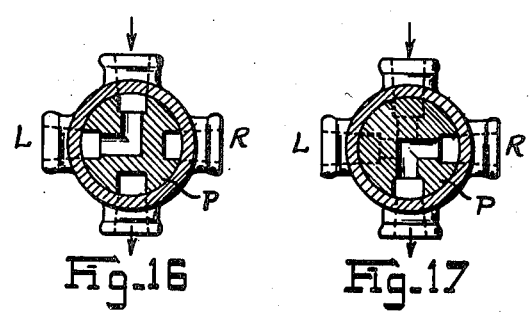

July 6, 1948.　　　　T. M. EDISON　　　　2,444,815
STEREOSCOPIC MAPPING INSTRUMENT
Filed July 29, 1943　　　　　　　　　9 Sheets-Sheet 8

Inventor
Theodore M. Edison

Patented July 6, 1948

2,444,815

UNITED STATES PATENT OFFICE 2,444,815

STEREOSCOPIC MAPPING INSTRUMENT

Theodore M. Edison, West Orange, N. J., assignor to American Geographical Society of New York, New York, N. Y., a corporation of New York Application July 29, 1943, Serial No. 496,611

19 Claims. (Cl. 33—1)

This invention relates to a stereoscopic mapping instrument of the type in which index-mark means are used in making three-dimensional measurements of the apparently three-dimensional object, or geometrical configuration, which an observer sees on looking through the instrument's optical system at a pair of properly oriented stereoscopic pictures of the object or configurations depicted.

In order to make accurate measurements, a number of extremely precise preliminary relationships must be established between the several components of a long train of mechanical elements, and since the relationships between successive pairs of elements in the train are independent of each other, yet progressive (i. e., one unit is mounted on the next), the problem of securing adequate high precision support for all elements is very troublesome. The device to be disclosed herein is the outcome of attempts to solve this problem and, at the same time, to retain the advantages of the instrument covered by U. S. Patent No. 1,985,260, issued to Osborn M. Miller, New York, N. Y. on December 25, 1934.

One object of my invention is to provide a mechanism in which even the most remote elements of the mechanical trains are supported comparatively directly by the main stationary base, and in which the paths through which support reaches these remote elements include only simple mechanical movements.

Another object of my invention is the minimizing of strain effects resulting from the shifting of loads in making preliminary settings, as well as in the measuring processes.

A third object is to reduce thermal errors by keeping support members out of the paths of heat rising from the index-mark light source units.

A forth objective is the elimination of certain settings of the index-mark support means by making these settings automatic and inherent in the design of the instrument.

A fifth objective is the provision of means whereby the operator can make most of his settings and measurements without leaving his seat or altering his position materially.

A sixth object is to provide comparatively simple precision support for a mechanism characterized by its ability to establish proper relative orientation of the axes of the measuring coordinate system and the pair of stereoscopic pictures under observation, without disturbing previously established relative orientation of the individual pictures composing the pair.

A seventh object is to simplify the procedure of distributing "closing errors" (encountered in aerial surveying) back through the chain of pictures comprosing a survey "strip" by providing an instrument with an inherently fixed measuring reference point that is left undisturbed by all measuring and preliminary setting movements.

An eighth objective is the simplification of the control of the measuring movements.

A ninth objective is the reduction of the effects of stress, strain, lost motion, and wear in the mechanism.

Other objectives and advantages of the device disclosed herein will be brought out in the course of the description which follows.

I attain the foregoing objects by mechanism illustrated in the accompanying drawings, in which—

Figure 1 is a geometrical diagram illustrating the principles upon which the operation of a stereoscopic mapping instrument is based.

Figure 2 is a schematic plan view of part of the instrument disclosed herein, showing the relationships between certain actual instrument elements and the geometrical theory developed in Fig. 1.

Figure 3 is a perspective view illustrating the several degrees of freedom used (in the procedure adopted for the instrument to be described) to specify the orientation of stereoscopic pictures with respect to reference coordinate axes.

Figures 4, 5, and 6 are the front elevation, side elevation, and plan view, respectively, of a typical specific structure for the goniometer portion of the instrument. Figure 5 also illustrates a means used to reduce friction in one of the measuring units.

Figure 7 is a structural plan view of the index mark support and coordinate measuring elements of the instrument, and includes, in the foreshortened lower portion of the figure, mounting pads and a schematic representation of the goniometers to bring out relationships to previous figures.

Figure 9:
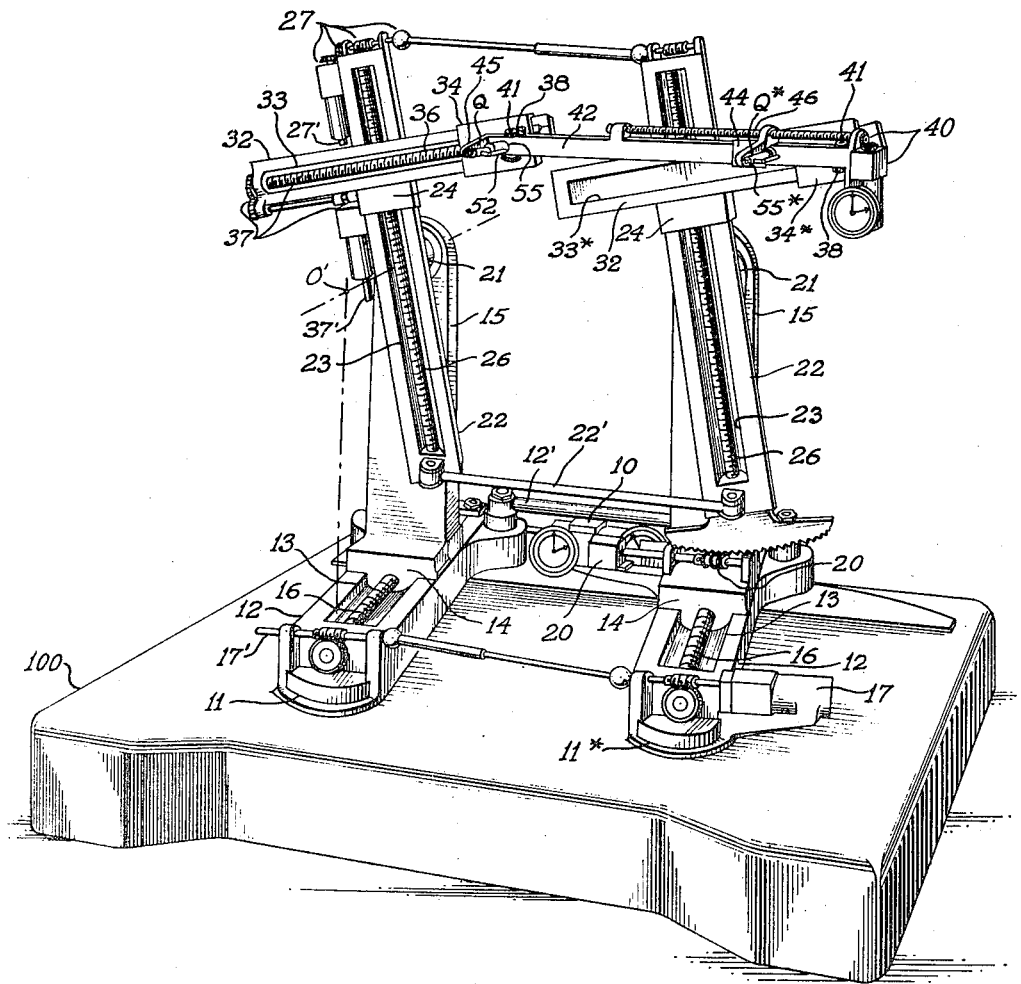

Figure 8 is a schematic view illustrating the geometrical properties of the mechanism shown in Fig. 7, and Fig. 9 is a perspective view of the same mechanism.

Figures 10 through 17 relate to the hydraulic means used in controlling the motions of the index mark movements in three mutually perpendicular directions; specifically, Fig. 10 is a schematic view of the motor-valve-pipe system; Fig. 11 is a perspectitve view showing the significance of the direction arrows indicated in Fig. 10; Fig. 12 is the front elevation of the manually controlled valve unit; Fig. 13 is a partial plan view of that unit; Fig. 14 is a cross section of valve Vz, taken substantially along the line 14—14 shown in Fig. 12; Fig. 15 is a partial view illustrating the interior construction of valves Vx and Vy; Figs. 16 and 17 are cross sections of one of these valves, taken along the lines 16—16 and 17—17, respectively, shown in Fig. 15.

Figure 18:
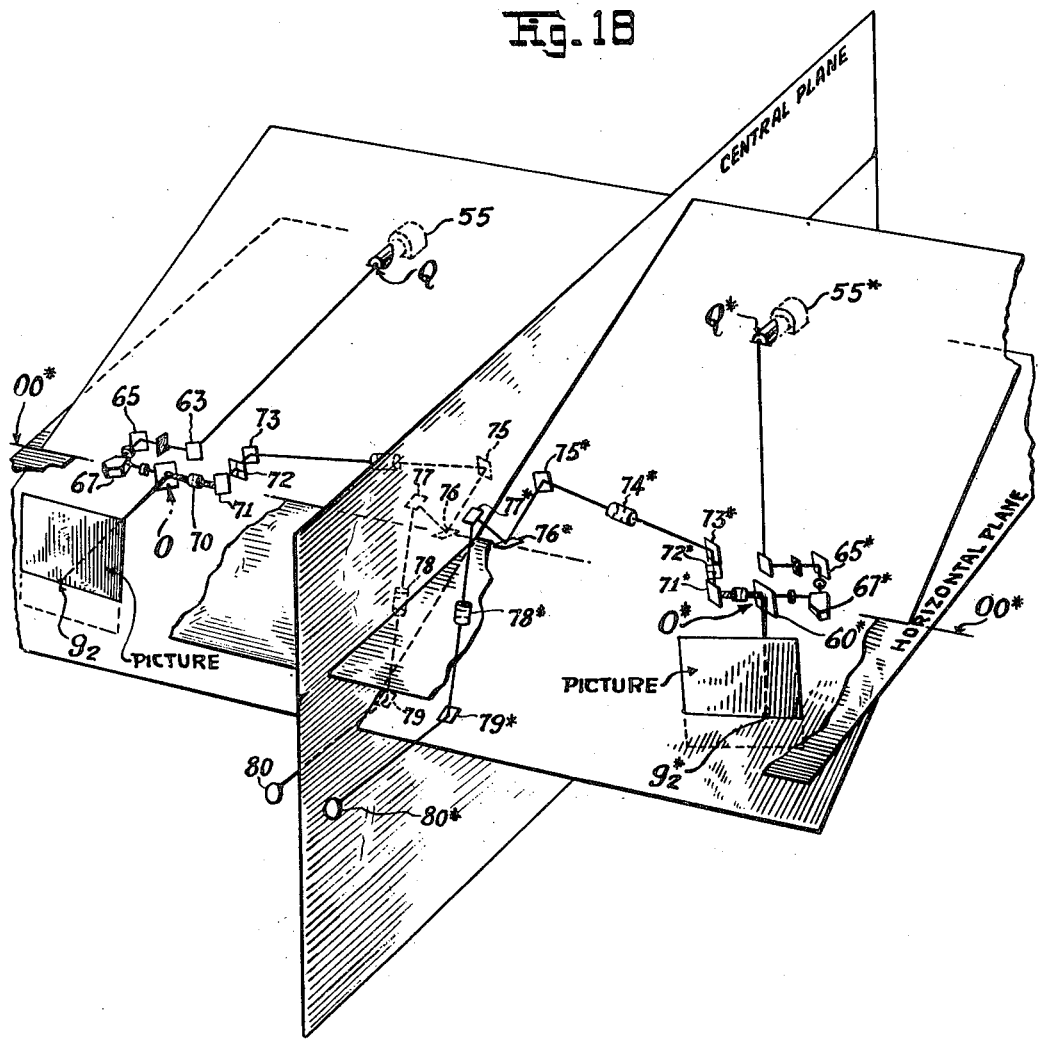
Figure 19:
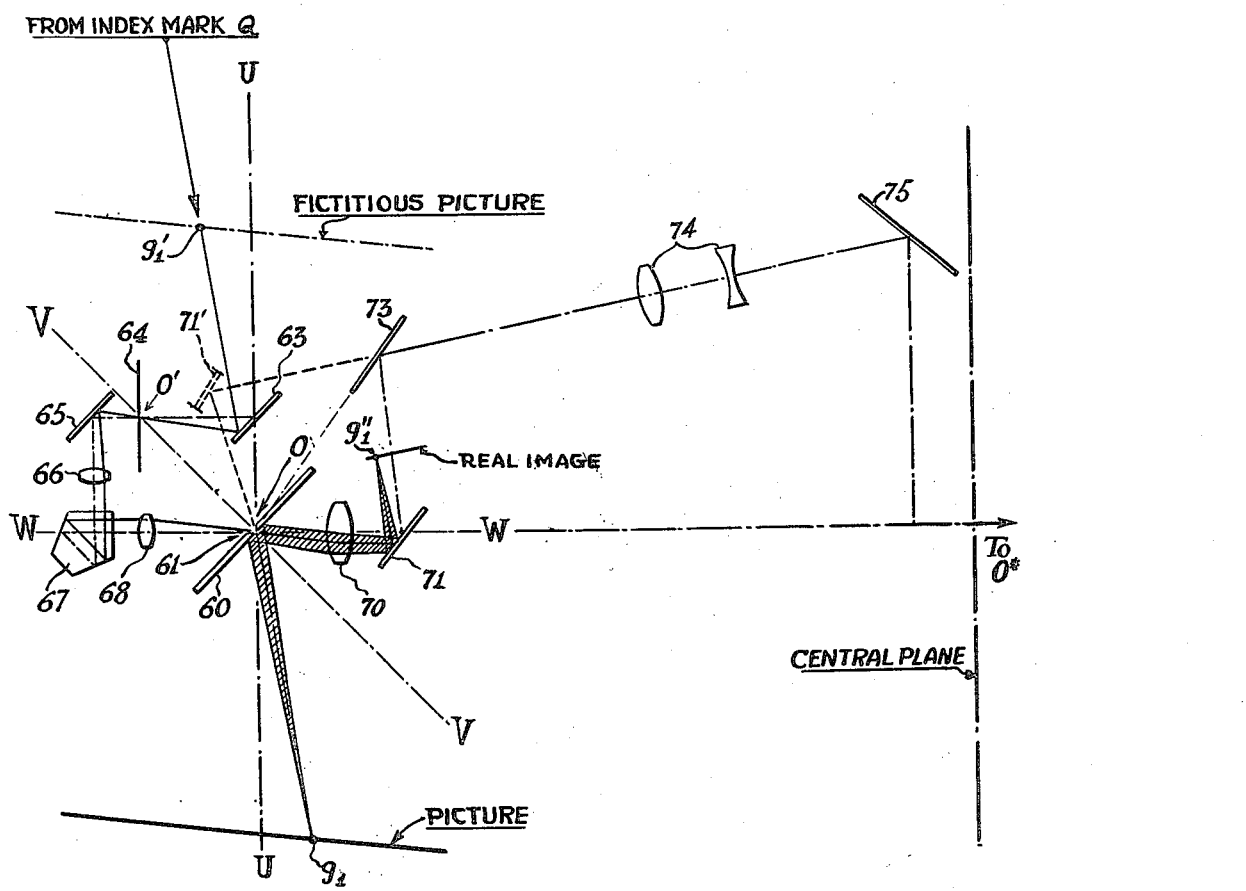

Figure 18 is a perspective schematic view of the instrument's optical system, and Fig. 19 is a schematic plan view of the important elements in part of the optical system on the left side of the instrument.

Similar numerals refer to similar parts throughout the several views.

The instrument was developed for the primary purpose of making maps from aerial photographs, and much of the description which follows will be related to that use. However, it is recognized that the instrument could be adapted to other purposes by one skilled in the art by mere changes in scale, changes in ranges of motions, or other simple modifications, and consequently, my invention is not intended to be restricted to the field of aerial surveying. The word "ground," as used herein, will be understood to have a significance broad enough to cover any actual object or geometrical configuration that may be made the subject of measurement in the instrument.

In order fully to understand the instant invention and the structure in which it is incorporated, it is first necessary to understand the fundamental geometrical relationships which underlie the functioning of the structure. These may be briefly explained with reference to Figs. 1 and 2.

Figure 1 illustrates schematically two respective positions or "air stations" occupied by the camera in the making of two successive photographs, the right-shown position $S_2$ being arbitrarily assumed to be later occupied, and higher, than the left-shown position $S_1$. An arbitrarily shaped ground in the territory being photographed is indicated; and two arbitrary points have been designated as $Gr_1$ and $Gr_2$ in that portion of the ground which will be included in each of the two photographs. The straight line between the two air stations may be referred to as the "air base," of length B.

For explanatory purposes two points O and O* have been shown on the air base, the point O coinciding with $S_1$. These points O and O* represent points in the instrument, as will hereinafter be more fully apparent, and may be termed "perspective centers." (The separation of O* from O is a fixed distance—shown, for clear illustration, vastly larger in proportion to B than it would be in aerial survey practice.)

If pictures made from the photographs respectively taken at $S_1$ and $S_2$ are properly set up respectively adjacent O and O* and respectively viewed therefrom stereoscopically, there is created, in effect, a "virtual stereo image" of the ground, so designated in Fig. 1. In its illustration, there have been indicated points $G_1^v$ and $G_2^v$ respectively corresponding to the real ground points $Gr_1$ and $Gr_2$. It will be appreciated that the proper setting up of the pictures involves such similarities between respective triangles that the scale of the virtual stereo image relative to the actual ground is $OO^*/S_1S_2$. Obviously, if some form of single real index mark, arranged to be viewed from O and O* simultaneously with the virtual stereo image, could be so moved that it apparently travelled over paths observed in that image while staying in apparent contact therewith, the locus of movement of that index mark would be a reproduction of the said paths on the reduced scale $OO^*/S_1S_2$. Such a process will be designated herein as a "scanning" of the image by the mark.

Such scanning of the virtual stereo image may be, and for various reasons preferably is, effected by a "virtual" (as distinguished from a real) single index mark. By this is meant an apparent single index mark in effect created by the viewing (again from O and O*, simultaneously with the viewing of the virtual stereo image) of two real index marks which are separated from each other, always on some line parallel with OO*, by a distance (less than OO*) which ordinarily is kept fixed during the viewing of the image formed by any one pair of pictures (though that distance may be varied from one picture-pair to another for purposes hereinafter made evident). Thus, in Fig. 1 there are shown schematically two real index marks Q and Q* at the ends of a line ($QQ^*$) which is arbitrarily positioned, but which is parallel with OO*. The left-hand index mark Q being seen from O, and the right-hand mark Q* from O*, a single virtual index mark will be created at $Q^v$. If the line QQ* be moved (without alteration of its length or parallelism with $QQ^*$) to the unique position in which the virtual index mark $Q^v$ will be caused to coincide with the virtual-stereo-image point $G_1^v$, the points Q and Q* will have been brought into coincidence, respectively, with the points $G_1$ (on line $OG_1^v$) and $G_1^*$ (on line $O^*G_1^v$). Again, if the line QQ* be moved (under the stated conditions) to the unique position in which $Q^v$ will be caused to coincide with the virtual-stereo-image point $G_2^v$, the points Q and Q* will have been brought into coincidence, respectively, with the points $G_2$ (on line $OG_2^v$) and $G_2^*$ (on line $O^*G_2^v$). It is not difficult to show that triangles $OG_1G_2$ and $OG_1^vG_2^v$ are similar, and that lines $G_1G_2$, $G_1^vG_2^v$, and $Gr_1Gr_2$ are parallel. If follows that if the line QQ* be so moved (maintaining the stated conditions) that the virtual index mark scans a path in the virtual stereo image, the locus of movement of each extremity of that line (e. g., of the left-hand index mark Q) will be a "model" of the corresponding ground path on a scale still smaller than $OO^*/S_1S_2$. After drawing lines from O* to intersect line $C_1G_1^*$ (extended) at $G_1^{**}$ and line $G_2G_2^*$ (extended) at $G_2^{}$, in such directions that the distances $G_1G_1^{}$ and $G_2G_2^{**}$ each equal OO*, it is easy to show that the scale of the model just mentioned, relative to the ground, is $b/B$, where $b$ equals $OO^*-QQ^*$, and $B=S_1S_2$.

The quantity $b/B$ is the scale of the model for all three dimensions, for no limitations were placed on the relative positions of $Gr_1$ and $Gr_2$ beyond their being ground points. It is not even essential that the points be on the surface of the "ground," for if for $Gr_2$ there be substituted a point $Da_3$ (e. g., in a "datum plane," such as sea level, below the ground), and if by any method of determination the virtual index mark $Q^v$ be brought into coincidence with that point $D_3^v$ which occupies in the virtual stereo image a position corresponding to that of point $Da_3$ in the ground (or actual object space), then the index mark Q will have been brought into the position designated as $D_3$, which bears, to scale, the same relationship to the model that the position of point $Da_3$ bears to the ground.

Now that the proportionality of the model to the actual ground has been demonstrated with the aid of Fig. 1, there may be discarded the fiction (convenient simply in that demonstration) that the perspective centers of the instrument (O and O*) are situated on the air base S₁S₂, and attention may be directed to Fig. 2—a showing in the geometrical relationships obtaining in the instrument alone. The description and proofs presented in connection with Fig. 1 are, however, valid for Fig. 2—for the latter figure constitutes simply a portion of Fig. 1 (turned through 180 degrees about the line OO*, and then rotated about 10 degrees in the plane of the paper to bring OO* horizontal). Figure 2 then becomes a schematic plan view of the instrument, together with the virtual stereo image, on whose formation the function of the instrument may conveniently be considered to be based. The perspective centers O and O* are disposed near the front of the instrument. Generally in front of the respective perspective centers, and centered thereon in adjustable manner later more fully noted, are respective goniometers, or frameworks, for holding the pictures. Immediately in front of the goniometers are appropriate diffuse light source for lighting the pictures (which are transparencies) by light transmission therethrough toward the perspective centers. There is movable in the region behind O the lefthand index mark Q (e. g., to positions such as G₁ and G₂), and in the region behind O* the righthand index mark Q* (e. g., to corresponding positions such as G₁* and G₂*). Each index mark functionally approximates a single intense point of light visible from its respective perspective center.

Each picture has been structurally described as being in front of, and each index mark as being behind, its respective perspective center, because this is a common setting arrangement of the parts in the preferred structure illustrated in later figures. With this arrangement, there is actually employed an optical system (hereinafter described), one of whose functions is to view each actual picture point (located forwardly from the perspective center) as though it were located equally distant rearwardly from the perspective center on a straight line passing through the actual picture point and that center. The result, as far as the formation of the virtual stereo image and its relation to the virtual index mark is concerned, is the same as though the whole picture were located rearwardly from the perspective center—and in this latter arrangement, it is easy to visualize the simultaneous viewing of both index mark and picture from that center, as postulated above. Accordingly, in considering the function of the instrument with respect to such simultaneous viewing of virtual stereo image and virtual index mark, it is warrantable—and may be most convenient—to think of each picture as a properly illuminated transparency held by a suitable fictitious extension of the respective goniometer in a respective fictitious position such as designated in Fig. 2 as "Fictitious picture," and as containing points such as $g_1'$ and $g_2'$, which are always homologous to the respective actual picture points $g_1$ and $g_2$ on the opposite side of the perspective center, whatever the adjustment of the goniometer.

Each goniometer may hold its respective picture so that the central point of the picture is on the "plate perpendicular" from the respective perspective center, and so that that point is, for example, at a distance from that perspective center equal to the calibrated focal length of the lens used in taking the photograph. Furthermore, each goniometer is so mounted relative to its respective perspective center that it has the same degrees of freedom of movement that it would have if it were supported by a ball-and-socket joint centered at the perspective center. This adjustability will not disturb the relationships of picture to perspective center just mentioned (nor will it disturb the homologous relationship between corresponding points in the real and fictitious pictures, since the fictitious goniometer extension will be adjusted simultaneously with the goniometer itself).

A specific mechanism for movement of each goniometer in the manner stated above is hereinafter described. In order to understand the purpose of this movability, however, as well as to facilitate the description of that mechanism, it is desirable first to note certain deviations from the intended or "ideal" stances of the camera—conveniently termed "elements of orientation"—which are inherent in the taking of aerial photographs. In this connection, reference is made to the next diagram.

In Fig. 3 (drawn in perspective), the plane at the bottom is to be taken as a horizontal plane, and the line near the front of this plane, designated "stipulated direction," may be taken as the stipulated straight course which a pilot attempts to follow in making a series of aerial mapping photographs, or as a line parallel thereto. The line actually shown contains a point vertically beneath the first air station S₁ of any pair S₁S₂. The vertical plane which contains S₁ and S₂ necessarily contains the air base, and may accordingly be termed a "basal" plane. Its intersection with the horizontal will not necessarily coincide with the stipulated direction, and its angular deviation therefrom is termed "base bearing" ($\omega$). The angular deviation of the air base from the horizontal, measured in the vertical basal plane, is termed "base inclination" ($\iota$).

In the making of each photograph, its plate perpendicular will lie in some basal plane, but this basal plane will not necessarily be the vertical basal plane. For the first photograph of the pair, the plate perpendicular has been illustrated as lying in an inclined basal plane, the angular deviation of which from the vertical basal plane is termed the "torque" ($\tau$) of that photograph. Since torque is an angle measured from the vertical basal plane (which plane varies from pair to pair of pictures in the series), each photograph may be considered to be characterized by a "principal torque," when it is the first photograph of a pair, and by a "subordinate torque" (not necessarily identical with its principal torque), when it is the second photograph of a pair. For any pair, the excess of the subordinate torque of the second photograph ($\tau_2$) over the principal torque of the first photograph ($\tau_1$) may be termed the "differential torque" ($\tau_{1,\,2}$).

The remaining two elements of orientation are similar to the torque in that they individually characterize each photograph according to its position in each pair, and to simplify Fig. 3, they have been illustrated for the first photograph only. Thus, in the making of each photograph, its plate perpendicular, although lying in a basal plane (e. g., the illustrated inclined plane for the first photograph), will not necessarily coincide with a perpendicular to the air base, and its angular deviation therefrom is termed "cant" ($\eta$).

Finally, the orientation of each photograph in its own plane about its plate perpendicular will be subject to variation from any "norm," or zero position, which may be selected for reference purposes, and its angular deviation from that norm is termed "swing" ($\sigma$).

It may now be stated that the purpose of the adjustability of the goniometers abovementioned is to permit the torque, cant, and swing orientations of each of the pictures in the instrument to be made in correspondence with those which characterized the respective photographs in their taking. At least the differential torque, as well as the cant and swing orientations, must be so made in order to form the previously described virtual stereo image, and this instrumental process is termed "bringing a pair of pictures into stereoscopic correspondence." The advantages flowing from the particular sets of primary, secondary, and tertiary elements of orientation adopted here are known in the art.

Since many of the components hereinafter described appear as direct or "mirror image" duplicates on opposite sides of the instrument, most of the detailed description and numeralization of parts will be confined to the instrument's left-hand side. In some cases, duplicate numbers may be used to designate parts on the right and left, and when it is necessary to distinguish between them, an asterisk will be added to specify the right-hand part. Furthermore, to avoid cluttering the drawings, certain elements do not appear in all views of the same portions of the instrument.

Figures 4 through 6 illustrate a specific typical structure comprising the goniometers and the means for adjusting them in the stated manner. The structure may be assembled to the relatively massive main base 100 of the instrument. Near the front of this base there extend upwardly therefrom four standards: 101 at the extreme left, 102 slightly to the left of the center, 101* at the extreme right, and 102* slightly to the right of the center, of the instrument. In their top portions, these standards are provided with respective bearings 103, 104, 103* and 104*, all in horizontal side-to-side alignment with each other along an axis shown in dash-dot lines in Figs. 4 and 6. The perspective centers of the instrument comprise points on this axis: O, midway between standards 101 and 102; and O*, midway between standards 101* and 102*.

Attention is directed, for the moment, to the left-hand side of the instrument. Journalled in bearings 103 and 104 is the goniometer cradle 105, of which the sides 106 (adjacent the standards) extend downwardly and forwardly from the bearing axis OO* (extended), and of which the central portion is a shelf 107 extending between the bottoms of the sides 106—on which shelf 107, through further mechanism later described, the rest of the goniometer is mounted. To each of the sides 106 there is secured a respective large worm-wheel sector 108, which may extend generally forwardly from the axis OO* when shelf 107 is horizontal. Each sector 108 may be engaged by a respective worm 109 mounted at the top extremity of a respective shaft 110 which extends diagonally upwardly and forwardly from a point near the bottom of the respective standard. Each shaft 110 may be journalled in respective upper and lower lugs, folded rightwardly from standard 101, and leftwardly from standard 102. Just above its respective lower end, each shaft 110 may have secured thereon a respective worm wheel 113. The two worm wheels may be engaged by respective worms 114 secured on a common horizontal shaft 115 journalled in and near the bottoms of standards 101 and 102. Shaft 115 may be driven by a small, relatively high speed, reversible motor 116, whose energization will serve to rotate cradle 105 at relatively slow speed, and consequently, to alter the torque orientation of the left-hand goniometer (see $\tau_1$, Fig. 3). Hence, the appropriate energization of the motor 116 may be used to adjust the principal torque of any pair of pictures which may be installed in the goniometers.

The elements described in the preceding paragraph may be duplicated, in "mirror-image" arrangement, on the right-hand side of the instrument, between standards 101* and 102*. Thus, it will be understood that the appropriate energization of the right-hand motor 116* serves to adjust the subordinate torque ($\tau_2$) for the second (right-hand) picture of any pair which may be installed in the goniometers.

It is here appropriate to note that the shafts 115 and 115* may each be extended toward the center of the instrument, where they may terminate in respective portions, 117 and 118, of a clutch—one portion of which may be, for illustrative purposes, a rectangularly-toothed wheel 117, and the other portion of which may be a cooperating disc 118, which carries, near its periphery, a pivotally mounted pawl 118a that may be swung into mesh with the teeth on wheel 117 to engage the clutch—and thus to interlock the shafts 115 and 115*. If the clutch is left disengaged and shelf 105 is left stationary, the energization of the motor 116* (which actually adjusts the subordinate torque of the right-hand picture) will serve to adjust the differential torque for the pair of pictures—the only torque adjustment required for the establishment of stereoscopic correspondence. When the desired differential torque is obtained, the clutch may be engaged, and thereafter, the energization of the left-hand motor 116 will adjust simultaneously and similarly the principal torque of the left-hand picture and the subordinate torque of the right-hand picture—or, in other words, it will adjust the principal torque for the pair without disturbing the already-established differential torque adjustment.

The left-hand goniometer is adjustable for cant (see $\eta$, Fig. 3) through the use of a table 119 supported by shelf 107 and pivoted to rotate about an axis 120 which always passes through the perspective center O and which always makes an angle of 90° with the axis OO*. This table can be set and held in a desired angular position by means of a compound worm gear reduction drive 121 controlled by a manually operated crank handle 122.

Swing adjustment of the left-hand goniometer (see $\sigma$, Fig. 3) comprises a rotation about the axis 123. This axis, which is the plate perpendicular of the picture 124 carried by the final goniometer element 125, always passes through the perspective center O and always makes an angle of 90° with the cant axis 120. Goniometer element 125 houses the light source used to illuminate picture 124. To permit this element to rotate about the swing axis the whole housing 125 is mounted on a pivot 126 journalled in an L-shaped supporting member 127. The manually operated worm gear drive system 128, mounted on member 127, cooperates with toothed member 125a, affixed rigidly to housing 125, to provide means for setting and holding swing angles.

Since the calibrated focal lengths of pictures used in the instrument may vary, means for adjusting the distance between the perspective center O and the picture 124 is provided by mounting support member 127 on a slide track 129 for movement in a direction parallel to the swing axis 128. The position of member 127 on track 129 may be precisely set through the use of a manually operated worm drive 130.

Parts similar to those described above provide for the independent setting of the cant, swing, and focal length of the right-hand goniometer.

The torque, cant, and swing settings (comprising the primary, secondary, and tertiary orientation settings of individual pictures—see Fig. 3) and the focal length settings of the respective goniometers may each be read quantitatively with the aid of suitable indicating means. Thus, scales 131 on sectors 108, in cooperation with pointers 132 on standards 101 and 101*, serve to measure torque; scales 133 on shelves 107, in cooperation with pointers 134 on tables 119, serve to measure cant; scales 135 on members 125a, in cooperation with pointers 136 on members 127, serve to measure swing; and scales 137 on tables 119, in cooperation with pointers 138 on members 127, serve to measure focal length. It will be understood that the scales and pointers shown are conventionalized for diagrammatic representation and that the actual measuring means employed would be made highly accurate through the use of devices such as verniers, or dial indicators similar to those described later. It will also be understood that all manual drives can be replaced by power drives, if desired.

The "virtual stereo image" mentioned in connection with Figures 1 and 2 is, in effect, created as soon as the goniometers are properly adjusted for differential torque, cant, and swung (i. e., as soon as the angular relationships between the pictures of a pair that characterized the pictures when they were taken are re-established in the instrument), but the additional elements of orientation, base bearing ($\omega$), base inclination ($\iota$), and principal torque ($\tau_1$) (with differential torque constant), are required to place the virtual stereo image as a whole in its proper position relative to the instrument's measuring coordinate system. For example, in Fig. 1, note that heights should not be measured in a direction at right angles to the "virtual air base" OO*, but rather, in a direction at right angles to the assumed horizontal datum plane passing through $Da_3$, and consequently, the height measuring mechanism in the instrument must be capable of being set to operate along lines making the proper angle [the angle $\iota$ in Fig. 3] with the perpendicular to the base OO*. In general, it may be observed that, even though O (Fig. 1) coincides with $S_1$, and the virtual stereo image is correctly formed with respect to OO*, lines such as $OG_1^V$ and $OG_2^V$ will not lie on corresponding lines from $S_1$ to the ground representing points $Gr_1$ and $Gr_2$ unless OO* is caused to lie on $S_1S_2$, and unless (in the particular case illustrated in Fig. 1) the plane of the section of the virtual stereo image shown is rotated about OO* as an axis until it coincides with the plane of the corresponding ground section. A primary instrument adjustment for base bearing ($\omega$) and a secondary instrument adjustment for base inclination ($\iota$) (see Fig. 3) are sufficient to bring OO* into coincidence with $S_1S_2$, and the tertiary instrument adjustment for principal torque ($\tau_1$) is all that is needed to complete the aligning process.

The various necessary orientation and measuring adjustments of instruments of the type described herein constitute a long train of high precision movements, many of which must be "in series." A proper selection of the fixed points of the train is extremely important, because the farther a movement is removed from the main stationary mounting base, the more difficult it becomes to provide the movement with adequate and accurate support and drive connections, and despite the fact that relative movements of the essential elements of the mechanism must remain unaltered, regardless of the method of mounting, a small change in the selection of fixed points may entail very great changes in instrument structure. Fortunately, in practise, an effort is made to approach ideal conditions (i. e., zero settings for base bearing, base inclination, cant, and swing), so that the ranges for these angular orientation corrections need not be great.

It is customary to employ a rectangular Cartesian coordinate system in making measurements of a model such as that shown in Fig. 2—the XY plane coinciding with the model's datum plane, and "heights" being measured in the Z direction—and, to simplify explanations, these conventions will be adopted in the following description. It will also be assumed that the X axis represents the "Stipulated direction" (see Fig. 3), having the same general direction as the "virtual air base" OO* (see Figs. 1 and 2). [Sometimes it may be desirable to reverse, or interchange coordinates, or to change the scale of some coordinate readings with respect to others (e. g., in the making of "profiles"), but means for obtaining these results, through the use of clutch and gear systems in the drive and registering units, are known in the art, and will not be discussed in detail here.]

Careful study of many different possibilities indicated that best results could probably be obtained by considering the perspective centers O and O* to be the principal fixed points of the instrument disclosed herein, and by so arranging the measuring elements of the instrument that the Z reference axis passes through the point O in such a direction that Fig. 2 becomes a schematic plan view of the "model" in the actual position in which it is ordinarily measured. Referring to Fig. 2, it will be seen that when a torque rotation about the axis OO* (effected by means already described) has brought the model's datum plane into the vertical position in which it is shown, Z ("height") measurements of the model relative to its datum plane can be made along horizontal axes in the instrument, while measurements in the X and Y directions (parallel to the model's datum plane) can be made in vertical planes in the instrument.

It follows from the conditions just mentioned that the primary orientation adjustment for a pair of pictures (base bearing $\omega$, see Fig. 3) can be obtained by rotating the X and Y coordinate axes about the Z axis (in a vertical plane), while the secondary orientation adjustment for a pair of pictures (base inclination $\iota$) can be obtained by rotating the Z axis about a vertical axis through the perspective center O (in a horizontal plane).

In connection with Fig. 2, it must be remembered that when an observer causes the effectively single observed index mark to appear to move about on—"scan"—selected paths on the "surface" of the observed stereo image (through the use of the instrument's optical system and coordinate movement drives, described here-after), the corresponding paths traced in space by the real index mark Q, in effect, create the "model." It must also be remembered that to produce the proper observed stereoscopic index mark "illusion," the real index mark Q* must follow the motions of the real index mark Q at a fixed distance—the line QQ* being always parallel to the stationary axis OO*.

The index marks Q and Q* are carried by a "multiple-parallelogram" structure, seen in plan in structural Fig. 7 and schematic Fig. 8, and in perspective in Fig. 9. For convenience, Fig. 7 (the lower portion of which is somewhat foreshortened as drawn) and Fig. 8 have been made to show a positioning of the index marks approximately appropriate to the scanning by the virtual index mark of the point $G_2^v$ in the virtual stereo image of Figs. 1 and 2. Because of the two-dimensional nature of Figs. 1, 2, 7, and 8, it was deemed advisable to reduce the chance of confusion by contemplating therein finite values for base inclination and respective picture cants only—zero settings being assumed for base bearing, principal torque, differential torque, and respective picture swings. Figure 9, whose three-dimensional nature presents the opportunity, has been made to indicate a finite value of base bearing, as well as of base inclination.

To aid in the understanding of the structure shown in Figs. 7, 8, and 9, the general purposes and functions of the several portions of the mechanism illustrated there will be discussed before going into a more detailed description of the parts.

Roughly speaking, the left-hand mechanism provides means for adjusting for base bearing and base inclination, and for obtaining X, Y, and Z coordinate movements: the more or less duplicate mechanism on the right maintains parallelism between the axes QQ* and OO*.

The geometrical properties of the system may be analyzed conveniently by first treating schematic Fig. 8 as though it were the plan view of a purely abstract 3-dimensional "design," entirely divorced from the instrument's physical structure. Thus, it will be observed that if the line QQ* is initially parallel to the line OO*, it will remain parallel to OO* (even though some of the other lines are assigned arbitrary directions in 3-dimensional space), provided (1) that the directions of line OO′ and O′O″ remain constant with respect to line OO*, (2) that the configuration QQ*Q″Q′ remains constant (i. e., acts like a rigid body), and (3) that OQQ′O′ and O′O″Q″Q′ both remain parallelograms, as Q moves along arbitrary paths (in 3-dimensional space) relative to OO*. The lengths of the sides of the parallelograms in provision (3) need not remain constant.

Within the limits of the specified requirements, a considerable range of choice is open to the designer. The discussion will now be somewhat restricted by introducing some of the design choices found in the illustrative apparatus described later. Thus, it will be assumed that the line OO′ is in the same horizontal plane as the stationary axis OO* and that the angle O′OO* is 90° It will also be assumed that line O′O″ is parallel to OO* at a horizontal distance K behind OO*, and that QQ*Q*′Q′ is a rectangle. Still treating Fig. 8 as a somewhat abstract design, note that O, O*, O′, and O″ can now be considered to be fixed points in a fixed coordinate system (i. e., a coordinate system in which the main mounting base is stationary— not the X, Y, Z coordinate system), and note also that, as "measured" in that coordinate system, any motions of Q relative to O lead to exactly duplicate motions of Q′ relative to O′, and Q″ relative to O″. [It can also be seen that if O*′ is placed a distance K behind O* on a line which is parallel to OO′, motions of Q*′ relative to O*′ will duplicate exactly the motions of Q* relative to O*.]

Anticipating the natural question as to why the two points in each of the respective pairs O and O′, Q and Q′, and O* and O″, could not be made to coincide, it may be stated that the separation of these points was more or less dictated by practical design considerations. In fact, means that permit the separation of these points, and that at the same time provide substantial support for both Q and Q*, constitute an important element of my invention, since, prior to the devising of such means, the difficulties in the way of obtaining a feasible and sufficiently accurate instrument possessing the advantageous features of the device disclosed herein were deemed to be almost insurmountable. For example, if Q and Q′ coincide, it is very hard to provide high precision pivoting mechanisms at Q, because, at times, Q may reach a position directly over O, and then (in the actual instrument) any vertical pivot member "at" Q would have to be so designed that it would not interfere with the light beam passing from Q to O, and, at the same time, this pivot member would have to clear the rotatable housing for the light source for the index mark Q. Moreover, heat rising from that housing might distort supporting members if they were placed directly above Q.

Figure 8 will now be related directly to the structure shown in Figs. 7 and 9, but before departing altogether from Fig. 8's abstract significance, attention is called to the fact that lines such as O′Q′ and O″Q″ (shown dotted) need have no physical existence, provided that the specified geometrical relationships are preserved. If key points are properly placed, and if the paths between key points on the left, however devious, are accurately duplicated by paths between corresponding key points in the right, it can be seen that the said geometrical relationships will be preserved, and consequently, it is unnecessary to give separate proofs to justify each step. However, in progressing through the description, it may be helpful to think of the "skeleton" of the apparatus as being composed of a succession of parallelograms in series—each pair of parallelograms having, in turn, a common side that is parallel to OO*.

The actual mechanism shown in Fig. 7 (the lower portion of which has been foreshortened to conserve space) and Fig. 9 will now be described, and in this connection, Fig. 8 may be conceived to be the schematic plan view of this mechanism.

The main stationary mounting base 100 is equipped with two principal vertical pivots 11 and 11*, separated from each other by an arbitrary distance (subject to choice in design), and disposed along a line parallel to axis OO* at an arbitrary distance K (see Fig. 8) behind OO*, and at a lower level. Pivot 11 is directly behind the point O, and its axis passes through the point O′.

Two parallel, horizontal slide arms 12 are pivoted at their forward extremities on the pivots 11 and 11*. The parallelism of these slide arms is maintained by a pivotally mounted link 12′ connecting corresponding points at the far ends of the respective arms—the distance between the pivots of 12' being exactly the same as the distance between pivots 11 and 11*. [To avoid constant repetition, the word "respective" will be omitted when it is obviously implied.] The slide arms 12 are provided with longitudinal tracks 13, along which are slidable platforms 14. By screws 16, the platforms 14 may be driven forwardly and rearwardly along the tracks 13. A suitable driving and interlocking mechanism 17 (e. g., the motor, worm gear drive units, universal joints, and telescoping, splined shaft indicated) is provided to move the two platforms while keeping them always at similar distances from the respective pivots 11 and 11*.

Rigidly mounted on platforms 14 are two vertical standards 15. These standards, together with the mechanism they support, are heavy, and unless anti-friction means are introduced, screws 16 will be subjected to considerable stress and wear in overcoming friction between slides 12 and platforms 14. Each of the standards 15 is, therefore, equipped with a support means like that shown in Fig. 5, comprising a spring 18, a plunger 19 slidable up and down inside of standard 15, and a pair of rollers 19a rotatably mounted on plunger 19 in such a way as to straddle screw 16 to run on the bottom of the groove in slide arm 12. This support means "floats" a large part of the weight placed on platforms 14— leaving just enough unbalanced force to insure firm contact between arms 12 and platforms 14. Thus, wear on precision parts is reduced, and the accuracy of the motions of the platforms is maintained, even though the rollers 19a follow irregularities in the surfaces on which they run, and the plungers 19 move up and down slightly as the platforms progress. The need for counterbalance means elsewhere in the instrument may not be great, but it will be appreciated that such means (where not shown) can be added readily, if desired.

A pair of parallel slide members 22 are pivotally mounted at 21 on standards 15 for rotation in planes perpendicular to the pivot axes. The axes of pivots 21 are parallel to the slide arms 12 and are in the same horizontal plane as the axis OO*, and thus, the pivot axes pass through the respective points O' and O''. Link 22', suitably mounted on members 22 by means of compound pivots that permit two degrees of rotational freedom, maintains the parallelism of members 22. Blocks 24, slidable along longitudinal tracks 23 in members 22, are so driven up and down these tracks by screw 26, in cooperation with driving and interlinking mechanism 27 (which includes a pair of universal joints and a splined, telescoping shaft), that they always occupy equivalent positions on their respective tracks.

Cross-arms 32, perpendicular to the direction of tracks 23 and also perpendicular to the direction of the axes of pivots 21, are rigidly secured to blocks 24. The cross-arms are provided with longitudinal tracks 33 and 33* which support and guide slidable blocks 34 and 34*, respectively. These latter blocks include protruding portions 35, which are used to support U-shaped brackets 38 (open to the front) on pivots having horizontal axes parallel to the slide arms 12.

Link-bar 42 passes between the prongs of the U's of brackets 38 and is held in position in these brackets by vertical pivot pins 41. [The compound pivots formed by the elements 35, 38 and 41 (see Fig. 7), have the same properties as the compound pivots at the ends of link 22'.] The distance between the axes of pivots 41 is equal to the distance between the axes of pivots 11 and 11*.

It can now be seen that if the essential dimensions of mechanical elements on the right side of the instrument are duplicates of those on the left (as shown), the motions of blocks 34 and 34* on their respective arms will be equivalent, and link-bar 42 will always be parallel to axis OO*. Thus, the centers of pivot pins 41 correspond to the points Q' and Q'' mentioned in the geometrical description associated with Fig. 8.

Drive mechanism 37 acts through screw 36 to move block 34 to any selected position on the tracks 33, and by virtue of the rigidity of link-bar 42, and the character of its associated pivot mountings, block 34* is forced to take up its proper position on tracks 33*.

In the instrument used for illustration, the index marks Q and Q* comprise intense, minute spots of light formed by lamp-lens-aperture systems mounted in housings 55 and 55*, respectively, and the motions of these spots of light are observed through the instrument's optical system. In some other types of instruments known in the art, the light beams passing from Q to O, and from Q* to O*, are replaced by respective physical (telescoping) shafts. The structure previously described could be used with either optical or mechanical scanning systems, but a showing of the optical system only will suffice for this disclosure.

Link-bar 42 includes an L-shaped extension 45, upon which lamphouse 55 is pivotally mounted for rotation about the horizontal axis 51. The mechanism is so arranged that the index mark Q assumes its proper position in the geometrical pattern described in connection with Fig. 8. In this case, Q lies on the axis 51 and is held directly in front of the center of pivot 41 (i. e., on a horizontal line that is perpendicular to link-bar 42 and that passes through the axis 41), and axis 51 is parallel to link-bar 42. The light source for Q is so designed that the index mark can be seen over an angular range that is large enough to obviate the need for rotation of the lamphouse 55 about a vertical axis through Q, but vertical angles are sometimes so extreme that the lamphouse must be tipped to keep the index mark visible. This infrequent tipping is accomplished manually by turning handle 52.

The Q* index mark unit comprises elements 52 and 55*, similar to those found in the Q index mark unit. Block 44, which is slidable on link-bar 42, supports the Q* unit in such a way that QQ* coincides with axis 51 and is always parallel to OO*, and housing 55* is pivotally mounted for rotation about axis 51.

As explained in connection with Fig. 1, the ratio of the size of the "model" to the size of the actual object originally photographed is equal to b/B, where b equals OO*—QQ*, and B is the length of the actual air base. Since maps are usually made from many pairs of overlapping pictures, and since B may have a different value for each pair of pictures, it is customary to vary the length b to compensate for variations in the length B, and thus make possible the measurement of a series of "models" at a uniform scale relative to the ground. The distance between the index marks Q and Q*—and hence, the length b—can be accurately set by screw drive unit 40, which drives block 44 by means of screw 46. [For calibration purposes, it may be desirable to design the instrument in such a way that QQ* can be made equal to OO*, even though no use is made of this setting in model measuring processes.]

With this background of information, it can be seen (see Fig. 9) that the independently driven screws 36, 26, and 16 move the index mark Q in three mutually perpendicular directions. These directions can be made parallel to the directions of the X, Y, and Z coordinate axes of the "model" by appropriate angular adjustments of member 22 on pivot 21 and of slide arm 12 on pivot 11. The angular displacement of the X axis direction (i. e., the direction of cross-arm 32) from the plane containing OO* and the Z axis is the base bearing angle ω of Fig. 3, while the angular displacement of the Z axis direction (i. e., the direction of slide arm 12) from perpendicularity to OO* corresponds to the base inclination angle ι of Fig. 3.

Adjustments of ι, ω, and b are effected by means of respective motor-worm-drive units 10, 20, and 40, into each of which has been incorporated a setting indicator that can be read from the operator's seat at the front of the instrument. Readings can be made with high precision, since many revolutions of a driving motor lead to rather small movements of the driven member, and the associated indicator can display readings proportional to motor revolutions. A clock type indicator, employing a plurality of hands geared together to register relatively major and minor measuring divisions, is one simple form of counter suitable for this purpose.

Attention is now called to the fact that "setting" adjustments for focal length, differential torque, cant, swing, principal torque, base bearing, base inclination, and scale, are preliminary in character: they first dispose the picture of a pair of such positions in the instrument that a properly formed "virtual stereo image" (Fig. 1), is created, and then, in effect, they convert this image into a scale model and move this model as a whole into its proper position [orientation] with respect to the instrument X, Y, Z coordinate measuring ["scanning"] movements. Once the setting adjustments have been made (ordinarily, by a systematic series of successive approximations), the model related to a pair of pictures can be "mapped" (i. e., its surface features can be scanned and registered in terms of X, Y, and Z coordinate measurements) without disturbing the preliminary settings. [In some leading contemporary instruments, it is impossible to orient the model as a whole without upsetting its internal perfection, and thus, additional complications are introduced into an inherently complex process.]

"Map plotting" may be carried out with the aid of an auxiliary plotting table (not shown). Such tables, which are known in the art, may comprise a drawing surface over which a marking stylus is guided in a path determined by the rotations of screws such as 36, 26 (and 16) (see Fig. 9). Change-gear, clutch, and "counter" units (not shown), interposed between these screws and the actual (two coordinate) drives for the stylus, provide for an independent choice of plotting scale for each coordinate direction, as well as for interchanges of coordinate directions and the registration of data concerning the (third) coordinate movement (that is not used in guiding the stylus). For example, with the two independent coordinate drives for the stylus properly connected (through intermediate mechanism) to the respective screws 36 and 16, an operator can plot a "profile," showing elevations above a selected base line parallel to the X coordinate axis (with vertical scales exaggerated, if desired) by turning screws 26 until Y reaches the selected value (as registered on a suitable counter), and then with Y constant, controlling the drives of screws 36 and 16 in such a way that the observed index mark (seen through the instrument's optical system) appears to move across the observed stereo image of the "model" while being kept in constant apparent contact with the model's surface. In like manner, ordinary contour maps can be plotted by "scanning" the model with Z constant, and with the stylus drives properly connected to the X and Y coordinate movement screws 36 and 26.

For the purposes of this presentation, it can be assumed that flexible shafting is used to connect the plotting table mechanism to the instrument mechanisms—though this is not necessarily the preferred form of connection. The instrument ends of the connecting shaft are indicated by the broken shaft extensions 17', 27', and 37' (Fig. 9). Note that the effects of lost motion in the connecting elements are reduced by making the speeds of the connecting shafts high compared to the speeds of the related coordinate drive screws.

In order to permit an operator to guide the index mark Q along an arbitrary path in three dimensions, it is desirable to be able to vary the speeds of each of the three coordinate drive motors 37, 27, and 17, independently, from a limiting negative value to a limiting positive value, smoothly, through zero. While electrical devices could have been used for this purpose, it appeared to be more practical to solve the problems involved hydraulically, and one suitable hydraulic system is indicated schematically in Figs. 10 through 17. To avoid cluttering the other figures, hydraulic piping, which can be flexible hose type, is not shown in them.

Figure 10 is a diagram of the general arrangement, in which each of the valves Vx, Vy, and Vz controls both the magnitude and direction of the fluid flow through the respective hydraulic motor (37, 27, or 17) with which it is associated. The indicated directions of the coordinate motions produced by the three motors correspond to the directions shown in perspective in Fig. 11, where there is also an illustration of an arbitrary direction obtained from three components.

Figure 12 is a partial front elevation of a hand control mechanism, of which Fig. 13 is a partial plan view. This mechanism is so constructed that an operator can manipulate all three valves (Vx, Vy, Vz) simultaneously, but independently, with one hand. Valve Vz has the rotary form shown in Fig. 14, while valves Vx and Vy are of the plunger type shown in partial cross section in Figs. 15, 16, and 17. Vertical handle H, mounted on universal joint J, passes through a pair of yoke slides Yx and Yy in such a way that a side-to-side motion of handle H operates valve Vx without disturbing the Vy plunger, while a front-to-back motion of H operates Vy without disturbing Xx. Neither motion disturbs Vz, which operates only when handle H is turned on its axis.

Figure 14 shows a horizontal cross section of valve Vz, made substantially along the line 14—14 of Fig. 12. In Fig. 14, it can be seen that clockwise rotation of core C connects the input to pipe L and the outlet to pipe R—the flow increasing with the angle, up to 45°. Counterclockwise rotation of H leads to similar results, but with the connections interchanged to reverse the flow through the motor 17.

In the case of valves Vx and Vy, linear movements of a plunger P (see Figs. 15–17), fitted with tapering grooves connected together in pairs, as indicated, replace the rotary motions of core C of Vz, but a study of the figures will show that, as a result of the linear motions mentioned, interchanges of connections and alterations of rates of flow, like those described for Vz, are obtained for Vx and Vy also.

The instrument's optical system is disclosed and claimed in detail in a co-pending United States patent application of Osborn M. Miller, Serial No. 475,596, filed February 12, 1943, now Patent 2,377,509, granted June 5, 1945, and assigned to the assignee of this application, and since the claims herein are not directed toward this portion of the instrument, the description of the optical system will be abridged.

Figure 2, previously discussed, illustrates the relationships between the index marks (Q and Q*), the perspective centers (O and O*), and the real and fictitious pictures, but it does not show the means used to merge rays from the pictures with properly aligned rays from the index marks (for convenient stereoscopic viewing by an observer). A schematic perspective representation of the complete optical system is shown in Fig. 18, while Fig. 19 depicts a number of the most important elements in greater detail and shows how they are related to Fig. 2. Settings for the components on the right and left sides of the instrument may differ, but otherwise, the optical systems on the right and left are substantially mirror images of each other. Thus, a description of one side will suffice for both.

Elements 60, 63, 65, 71, 73, 75, 76, 77, and 79 are mirrors; 64 is a "pinhole" diaphragm; 66, 68, 70, 74, 78, and 80 are lenses, or lens systems; index mark Q is a "pin-point" light source (here assumed to be effectively produced by suitable optical system (not shown) contained in the housing 55 behind Q); and 61 is a "pinhole" in mirror 60, positioned at the perspective center O.

For convenient description, the optical elements are related to three coplanar axes U—U, V—V, and W—W, intersecting at O, and spaced at 45° intervals, and at first it will be assumed that the W—W axis coincides with the OO* axis, and that the U—U axis is horizontal (as illustrated in Fig. 19). The planes of mirrors 60, 63, and 65 are perpendicular to axis V—V; "pinhole" O' lies on V—V; the planes of mirrors 71, 73, and 75, and the reflecting and transmitting surfaces of the pentagon prism 67, are perpendicular to the plane determined by U—U and W—W (hereinafter called the UW plane); and the optical axes of the lenses lie in the latter plane. The optional elements are so arranged that rays from the index mark (Q) which, if mirror 63 had been omitted, would have gone directly to O, are first deflected by mirror 63 and caused to pass through O'. The elements in the optical path between O' and O conduct these rays to O, but introduce a full optical inversion in the process. The function of the device is to merge the rays (from Q) that pass through a point such as $g_1'$ (Fig. 19) in the fictitious picture with those that come from the corresponding point $g_1$ in the real picture, and to make possible (with the aid of 70 and 71) the bringing of both sets of rays into coincidence at the point $g_1''$ in the real image of the picture. It should be remembered that points Q, $g_1'$, O, and $g_1$ must always remain in alignment as Q is moved about along three-dimensional arbitrary paths in the neighborhood of axis U—U (which axis is here assumed to be stationary), and a study of Fig. 19 will show that this condition is fulfilled by the optical system indicated.

The real image mentioned (see Fig. 19) can be superimposed upon a reticle 72 (see Fig. 18), and rays from this composite "object" will then traverse the indicated optical path to reach the observer's eye through eyepiece 80.

Because of magnification requirements, the observer's field of view will not embrace the entire picture, and consequently, some of the optical elements must be capable of movement in order to permit the shifting of the field of view from one part of the picture area to another. A primary rotation of the UW plane and associated optical elements bearing numbers between 60 and 75, inclusive) about the OO* axis, in combination with a half-speed angular displacement of mirror 76 about axis OO* in the same direction, effects a "vertical" shifting of the field of view without disturbing the geometrical relationships previously described, and without requiring a change in the position of the observer's eye.

A similar "horizontal" shifting of the field of view is obtained by rotating, as a "unit," the elements bearing the numbers between 60 and 72, inclusive, in the UW plane about a secondary axis that passes through O and that is perpendicular to the UW plane, and at the same time rotating mirror 73 about the same axis, and in the same direction, at half the angular speed.

The "viewing movements" do not alter the length of the optical path between O and 80. To see that this is so in the case of the horizontal viewing movement, imagine a mirror 71' in the position indicated in Fig. 19. Suppose that this fictitious mirror is always perpendicular to the UW plane, but that it does not rotate with the U—U, V—V, W—W axes in the UW plane—maintaining instead, a fixed relationship with axis OO*. Suppose further that mirrors 71 and 71' are symmetrically disposed with respect to the plane of mirror 73, so that the latter plane bisects the angles of the quadrilateral shown one side of which is a continuation of the line joining mirrors 75 and 73. Since the triangles formed are congruent, the path O—71—73—75 is equal in length to the path O—71'—73—75. This state of affairs obtains regardless of the settings of the viewing movements, and since the fictitious path O—71'—73—75 has a constant length, it follows that the length of the actual path O—71—73—75 is constant also.

There is, however, a variation in the distance between O and $g_1$, and an occasional adjustment of focus may become necessary. Unless compensation is introduced, this focal adjustment will alter the magnifying power of the optical system, and consequently to avoid eyestrain in the stereoscopic use of the instrument, the elements of the lens system 74 are made subject to a semi-automatic differential motion [mechanism not shown] that corrects the focus and magnification simultaneously.

Conventional focus and interocular distance adjustment means are assumed to be present in the eyepiece systems, even though they do not appear in the figures.

The mode of operation of the preferred form tionships between said perspective centers and said mapping system; and index-mark means movable in the instrument and guided by said coordinate-direction-defining elements to effect three-dimensional scanning of the pictures.

4. A stereoscopic mapping instrument having a stationary main mounting member and a pair of perspective centers occupying permanently fixed positions relative to said mounting member, about which centers are orientatable, respectively, two goniometers adapted to hold the respective pictures forming a stereoscopic pair, and including coordinate-direction-defining elements, the directions of which elements define the directions of the axes of a Cartesian coordinate mapping system in said instrument, further including means, comprising means for orientationally adjusting said elements relative to said mounting member, for obtaining, independently, true base bearing and true base inclination relationships between said perspective centers and said Cartesian coordinate mapping system, and further including index-mark means movable in the instrument and guided by said coordinate-direction-defining elements to effect three-dimensional scanning of the pictures while the goniometers remain stationary.

5. In a stereoscopic mapping instrument having a permanently stationary mounting member and a pair of perspective centers occupying fixed positions relative to said mounting member, about which centers are orientatable, respectively, two goniometers adapted to hold the respective pictures forming a stereoscopic pair: at least three coordinate direction defining elements, the directions of which three elements define, respectively, the directions of the X, Y, and Z reference axes of a Cartesian coordinate mapping system in the instrument; index mark means, including at least one index mark, movable in the instrument and guided by said coordinate direction defining elements to effect three-dimensional scanning of the pictures; measuring means, associated with said elements, adapted to register the extent of the motions of said index mark means, measured from arbitarily selected initial positions, relative to said X, Y, and Z reference axes in each of the coordinate directions independently; means, comprising a pivot mounted on said mounting member and operative connections extending between said pivot and said index mark, whereby said elements, as a group, may be rotated about said pivot to effect a rotation of said index mark about an axis through one of said perspective centers perpendicular to a line passing through said perspective centers, thus to secure a true base inclination adjustment while maintaining constant the registered coordinate positions of said index mark relative to said one perspective center in said mapping system; and means, comprising a second pivot and operative connections between said second pivot and said index mark, whereby two elements of said group, as a subgroup, may be rotated about the axis of said second pivot to effect a rotation of said index mark about an axis passing through said one perspective center, thus to secure a true base bearing adjustment while maintaining constant the registered coordinate positions of said index mark relative to said one perspective center in said mapping system.

6. The combination according to claim 5, further including: a second index mark and means for automatically maintaining said second index mark on a line parallel to a line passing through said perspective centers while said elements are orientationally adjusted relative to said perspective centers.

7. In a stereoscopic mapping instrument having a pair of perspective centers about which respective goniometers are adjustably orientatable, and including index-mark means for the scanning of pictures held in the goniometers: a mechanical system within which the index-mark means is movable in coordinate-representing directions, including a parallelogram structure having slide arms pivoted on axes fixed with respect to said perspective centers, and a second parallelogram structure having slide members pivotally mounted on standards carried by the said slide arms of the first parallelogram structure, the axes of the pivots of the said slide members being perpendicular to the axes of the pivots of said slide arms, and said directions being orientationally responsive to the orientations of each of said two parallelogram structures.

8. In a stereoscopic mapping instrument having a pair of perspective centers about which respective goniometers are adjustably orientatable, and including index-mark means for the scanning of pictures held in the goniometers: a mechanical system within which the index-mark means is movable in coordinate-representing directions, including a parallelogram structure having slide arms pivoted on axes fixed with respect to the perspective centers, a second parallelogram structure having slide members pivotally mounted on standards carried by the respective slide arms of the first parallelogram structure, two cross-arms respectively carried by said slide members, and a support for the index-mark means having extremities respectively carried by said cross-arms.

9. The combination according to the preceding claim, wherein said support extremities are movable along said cross-arms, said cross-arms are jointly movable along said respective slide members, and said slide members are jointly movable along said respective slide arms, whereby to effect X-, Y- and Z-coordinate-representing movements of the index-mark means.

10. In a stereoscopic mapping instrument having a pair of perspective centers separated along a predetermined line and about which there are adjustably orientatable respective goniometers for holding the respective pictures of a stereoscopic pair: a mechanical system within which index-mark means is movable in coordinate-representing directions, including a slide arm pivoted on an axis perpendicular to a plane containing said predetermined line, a slide member pivotally carried by said slide arm and movable therealong for one coordinate-representing movement, the axis of pivoting of said slide member lying in said plane and intersecting said first pivoting axis, a cross-arm carried by said slide member and movable therealong for a second coordinate-representing movement, and an index mark supported by said cross-arm and movable therealong for a third coordinate-representing movement.

11. The combination according to claim 10, wherein said first pivot axis is finitely displaced from said one perspective center, wherein there is interposed between the index mark and the cross-arm a pivot having an axis parallel to said first pivot axis, and wherein there is further included means maintaining the index mark in a position displaced from the axis of said interposed pivot by a distance always equal in magnitude and direction to the distance by which said one perspective center is displaced from said first pivot axis.

12. In a stereoscopic mapping instrument having a first perspective center and a second perspective center, separated along a predetermined line, about which centers are adjustably orientatable respective goniometers for holding the respective pictures of a stereoscopic pair: a first direction-defining arm and a second direction-defining arm, respectively pivoted on axes occupying fixed positions relative to said predetermined line, said axes being perpendicular to a plane containing said predetermined line, and the axis of the pivot of said first arm intersecting said plane at a point displaced from said first perspective center; a link member operatively interconnecting said arms to maintain parallelism between them; a first pivot member, carried by said first arm; a second pivot member, carried by said second arm; a link bar pivotally mounted on said first pivot member and also pivotally mounted on said second pivot member, the distance between the pivot axes of said link bar being the same in magnitude and direction as the distance between the pivot axes of said arms, and the axes of the link bar pivots being parallel to the axes of the arm pivots; at least one index mark carried by said link bar, said index mark being displaced from the pivot axis of said first pivot member by a distance equal in magnitude and direction to the distance by which said first perspective center is displaced from the pivot axis of said first arm; whereby said arms may be rotated about their pivot axes to secure base inclination adjustment without altering the distance between said index mark and said first perspective center.

13. In a stereoscopic mapping instrument having a first perspective center and a second perspective center, separated along a predetermined line, and about which centers are adjustably orientatable respective goniometers for holding the respective pictures of a stereoscopic pair: a first direction-defining member and a second direction-defining member, respectively pivoted for rotation about two parallel axes; a link member operatively interconnecting said direction-defining members to maintain parallelism between them; a first compound pivot member, carried by said first direction-defining member; a second compound pivot member, carried by said second direction-defining member, the position of said second pivot member relative to said second direction-defining member being the same as the position of said first pivot member relative to said first direction-defining member; a link bar pivotally mounted on both of said compound pivot members for two degrees of angular freedom at each pivotal mounting, said link bar serving to keep the distances between corresponding points in said compound pivot members equal to the distance between the axes of the pivots of said first and second direction-defining members, said distances being measured in parallel directions; at least one index mark, mounted on said link bar, by virtue of which mounting, rotations of said direction-defining members about their respective pivot axes serve to rotate said index mark about an axis parallel to the pivot axes of said direction-defining members; the elements of the mechanism being so placed that the axis about which said index mark is rotatable passes through said first perspective center, thereby permitting base bearing adjustment without altering the distance between said index mark and said first perspective center.

14. In a stereoscopic mapping instrument having a permanently stationary mounting member, and a pair of perspective centers, separated along a predetermined line and occupying permanently fixed positions relative to said mounting member, and about which centers are adjustably orientatable respective goniometers for holding the respective pictures of a stereoscopic pair, and including at least one index mark for picture scanning: a mechanical system including a first arm, a second arm carried by, and movable along, said first arm, and index-mark means carried by, and movable along said second arm, movements along said first and second arms providing for independent movements of said index mark in two coordinate-representing directions, which directions define a datum plane; and means, comprising a third arm pivotally mounted on said mounting member and adapted to carry said first arm, for rotating said datum plane about a fixed line through one of said perspective centers perpendicular to said predetermined line.

15. The combination according to claim 14, further including a pivotal mounting of said first arm on a pivot member carried by said third arm, whereby said first arm may be rotated to secure an effective rotation of said coordinate-representing directions about an axis passing through said one perspective center.

16. In a stereoscopic mapping instrument having a mounting member and a pair of perspective centers occupying fixed positions relative to said mounting member, and about which centers are orientatable, respectively, two goniometers adapted to hold the respective pictures forming a stereoscopic pair: at least one Cartesian coordinate unit comprising a first coordinate-direction-defining arm pivotally mounted on said mounting member, a second coordinate-direction-defining arm pivotally carried by said first arm and movable therealong, a third coordinate-direction-defining arm movable along said second arm, and index-mark means supported by said third arm and movable therealong; whereby said pictures may be scanned while the goniometers remain stationary.

17. The combination according to claim 16, wherein said three coordinate-direction-defining arms define a Cartesian coordinate mapping system in the instrument, and wherein said index-mark means includes at least one index mark rotatable, by pivotal movement of said first arm on its pivot mounting, about a first axial line passing through one of said perspective centers, and further independently rotatable, by pivotal movement of said second arm on its pivot mounting, about a second axial line passing through said one perspective center; said pivotal movements providing, respectively, and independently, for true base inclination and true base bearing adjustments of said mapping system relative to said perspective centers, while maintaining constant the position of said one perspective center in said mapping system.

18. A stereoscopic mapping instrument comprising: a mounting member; a first Cartesian coordinate unit, including coordinate direction defining elements, one of which elements is pivotally mounted on said mounting member; a second Cartesian coordinate unit, including coordinate direction defining elements, one of which elements is pivotally mounted on said mounting member for rotation about an axis parallel to the pivot axis of the first mentioned pivotal mounting; interlinking elements extending between, and operatively interconnecting, said units to maintain parallelism between corresponding elements of the respective units, principal functional points in said units being disposed in multiple parallelogram arrangement.

19. The combination according to claim 18, wherein said instrument is characterized as having two perspective centers occupying fixed positions relative to said mounting member, and wherein said instrument further includes two index marks, separated along a line parallel to a line passing through said perspective centers, and carried by one of said interlinking elements; whereby parallelism is automatically maintained between said two lines while said elements are orientationally adjusted relative to said perspective centers.

THEODORE M. EDISON.

REFERENCES CITED

The following references are of record in the file of this patent:

UNITED STATES PATENTS

| Number | Name | Date |
| --- | --- | --- |
| 185,682 | Johnson | Dec. 26, 1876 |
| 1,381,188 | Gary | June 14, 1921 |
| 1,467,163 | Hugershoff | Sept. 4, 1923 |
| 1,793,217 | Fourcade | Feb. 17, 1931 |
| 2,224,725 | Felt | Dec. 10, 1940 |
| 2,377,509 | Miller | June 5, 1945 |

FOREIGN PATENTS

| Number | Country | Date |
| --- | --- | --- |
| 416,691 | Great Britain | Sept. 19, 1943 |
| 527,528 | Great Britain | Oct. 10, 1940 |